United States Patent
Roth

[11] Patent Number: 6,076,975
[45] Date of Patent: Jun. 20, 2000

[54] FIBER OPTIC CONNECTOR ASSEMBLY

[75] Inventor: Richard Roth, Downers Grove, Ill.

[73] Assignee: Molex Incorporated, Lisle, Ill.

[21] Appl. No.: 09/174,369

[22] Filed: Oct. 15, 1998

[51] Int. Cl.[7] ................................................ G02B 6/36
[52] U.S. Cl. .............................. 385/76; 385/60; 385/77; 385/89
[58] Field of Search ................................ 385/53, 56, 60, 385/76, 77, 78, 81, 88, 92, 135, 89

[56] References Cited

U.S. PATENT DOCUMENTS

| | | | |
|---|---|---|---|
| 4,895,425 | 1/1990 | Iwano et al. | 350/96.2 |
| 5,121,454 | 6/1992 | Iwano et al. | 385/60 |
| 5,404,416 | 4/1995 | Iwano et al. | 385/60 |
| 5,418,875 | 5/1995 | Nakano et al. | 385/77 |
| 5,475,781 | 12/1995 | Chang et al. | 385/76 |
| 5,528,711 | 6/1996 | Iwano et al. | 385/56 |
| 5,537,501 | 7/1996 | Iwano et al. | 385/58 |
| 5,598,495 | 1/1997 | Rittle et al. | 385/76 |
| 5,600,746 | 2/1997 | Arnett | 385/53 |
| 5,673,346 | 9/1997 | Iwano et al. | 385/60 |

FOREIGN PATENT DOCUMENTS 19619374  8/1997  Germany .

*Primary Examiner*—Hemang Sanghavi
*Attorney, Agent, or Firm*—A. A. Tirva

[57] ABSTRACT

A fiber optic connector assembly includes a housing and an adapter mountable on the housing. A fiber optic connector is insertable into the adapter in an insertion direction. First complementary latches are provided between the adapter and the housing to restrict relative movement therebetween in the insertion direction but allow relative movement therebetween in a lateral direction. Second complementary latches are provided between the adapter and the fiber optic connector to couple the connector to the adapter for movement therewith. A release is provided on the fiber optic connector operatively associated with the first latches to disengage the first latches when the second latches are engaged and, thereby, remove the restriction on the relative movement of the adapter in the insertion direction.

28 Claims, 8 Drawing Sheets

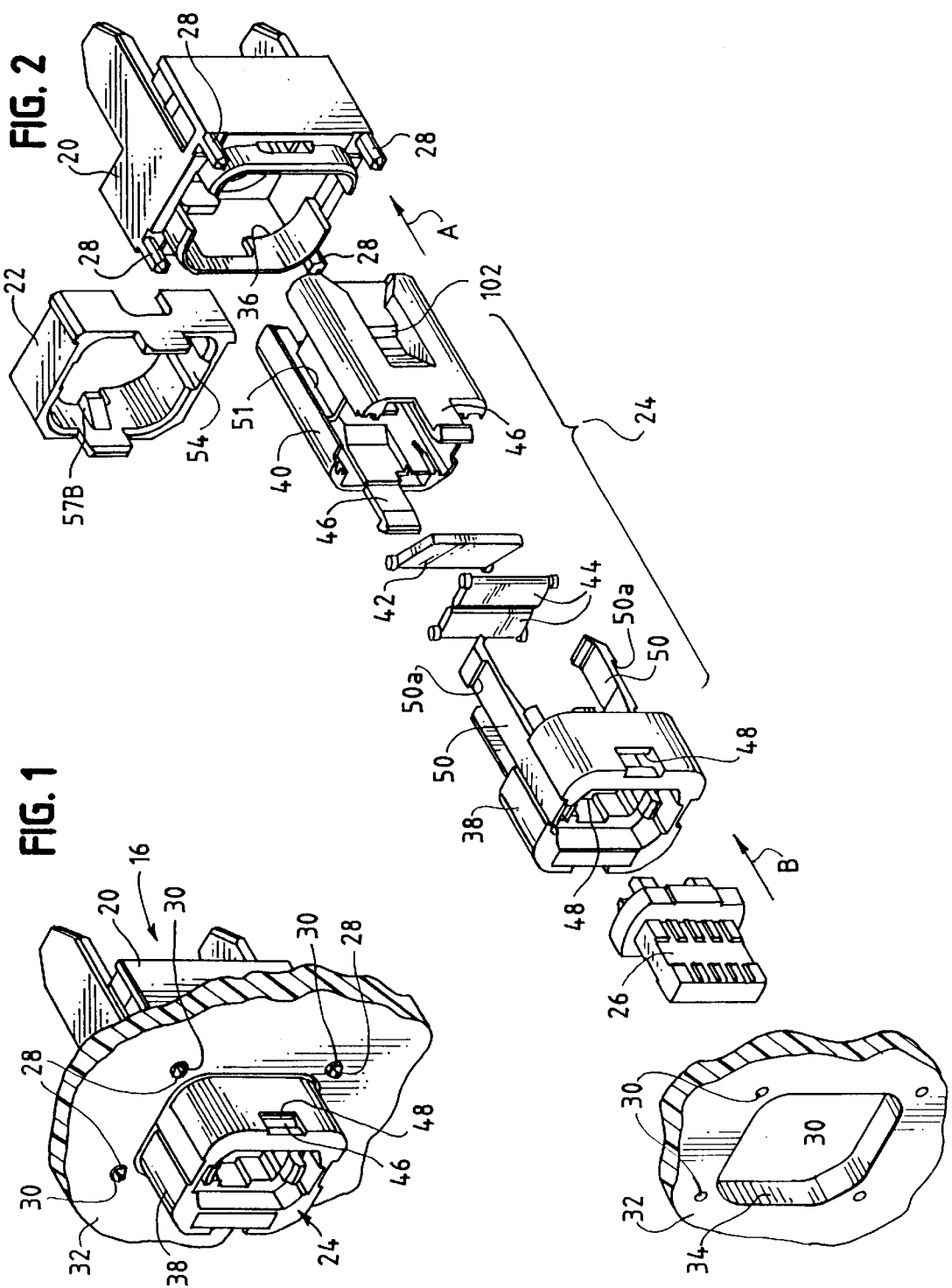

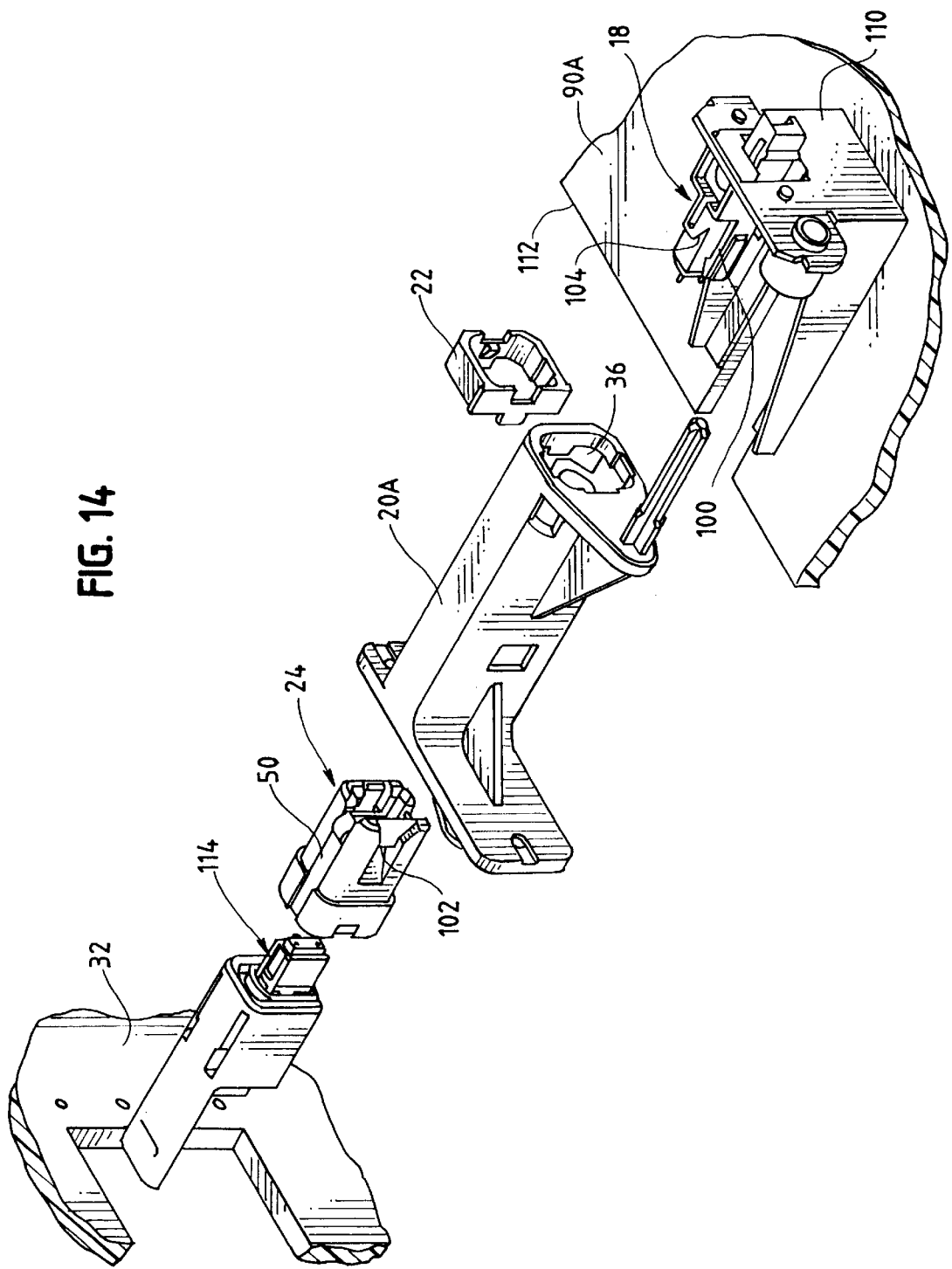

FIBER OPTIC CONNECTOR ASSEMBLY

FIELD OF THE INVENTION

This invention generally relates to the art of fiber optic connector assemblies.

BACKGROUND OF THE INVENTION

Fiber optic connectors of a wide variety of designs have been employed to terminate optical fiber cables and to facilitate connection of the cables to other cables or other optical fiber transmission devices. A typical fiber optic connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an inline component, or the adapter can be designed for mounting in an opening in a panel, backplane, circuit board or the like. The adapter may be mounted on a printed circuit board such as a Patent motherboard, and one of the connectors received by the adapter may be mounted to a daughterboard.

The present invention is directed to various improvements in such optical fiber apparatus.

SUMMARY OF THE INVENTION

An object, therefore, of the invention is to provide a new and improved fiber optic connector assembly of the character described.

In the exemplary embodiment of the invention, the assembly includes a housing and an adapter mountable on the housing. A fiber optic connector is insertable into the adapter in an insertion direction. First complementary engagement means are provided between the adapter and the housing to restrict relative movement therebetween in the insertion direction while allowing relative movement therebetween in a lateral direction generally transverse to the insertion direction. Second complementary engagement means are provided between the adapter and the fiber optic connector to couple the connector to the adapter for movement therewith. Release means are provided on the fiber optic connector operatively associated with the first complementary engagement means to disengage the first complementary engagement means when the second complementary engagement means are engaged. Therefore, the restriction on relative movement of the adapter in the insertion direction is removed when the connector is coupled to the adapter.

As disclosed herein, the housing is a two-part assembly including an outer housing part and an inner housing insert. The first complementary engagement means are provided between the adapter and the inner housing insert which is mounted in the outer Patent housing part with a loose engagement in the lateral direction while being restricted against relative movement in the insertion direction.

The first complementary engagement means may comprise at least one flexible latch arm on the adapter engageable with a fixed latch shoulder on the housing insert. The second complementary engagement means may comprise at least one flexible latch arm on the fiber optic connector engageable with a fixed latch shoulder on the adapter. The release means may comprise a detent on the fiber optic connector engageable with the flexible latch arm on the adapter to move the latch arm out of engagement with the fixed latch shoulder on the housing insert.

In the preferred embodiment, the outer housing part of the two-part housing assembly is adapted for mounting on a printed circuit board, such as a motherboard, with the adapter projecting through an aperture in the board. The fiber optic connector is adapted for mounting on a second printed circuit board, such as a daughterboard. With the unique system of the invention, the adapter is latched in a fixed position in the insertion direction of the fiber optic connector so that the connector can easily engage the adapter. However, once the connector is engaged, the latched condition of the adapter is released and the connector can float with the adapter relative to the motherboard. This eliminates interacting forces between the daughterboard and the motherboard which, otherwise, could cause cracking, deformation, misalignment and/or poor performance of the boards.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a perspective view of the motherboard adapter assembly mounted through an aperture in a printed circuit board (motherboard);

FIG. 2 is an exploded perspective view of the motherboard adapter assembly in conjunction with the motherboard;

FIG. 14 is an exploded perspective view of the fiber optic connector assembly shown in FIG. 13.

DETAILED DESCRIPTION OF THE PREFERRED EMBODIMENTS

Figure 11:
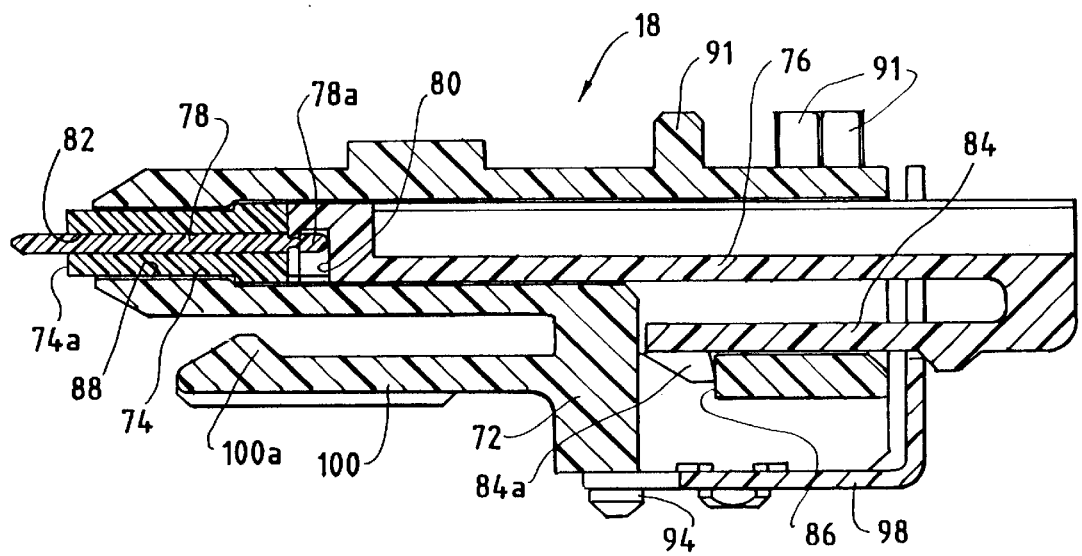
FIG. 11 is a horizontal section taken generally along line 11—11 of FIG. 9, with the daughterboard removed.
Figure 12:
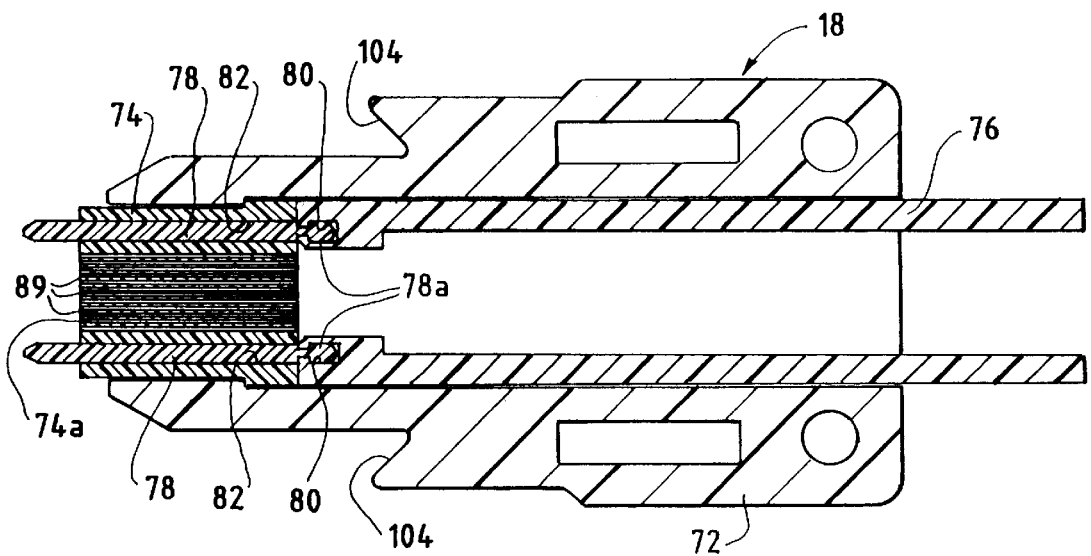
FIG. 12 is a vertical section taken generally along line 12—12 of FIG. 9.
Figure 13:
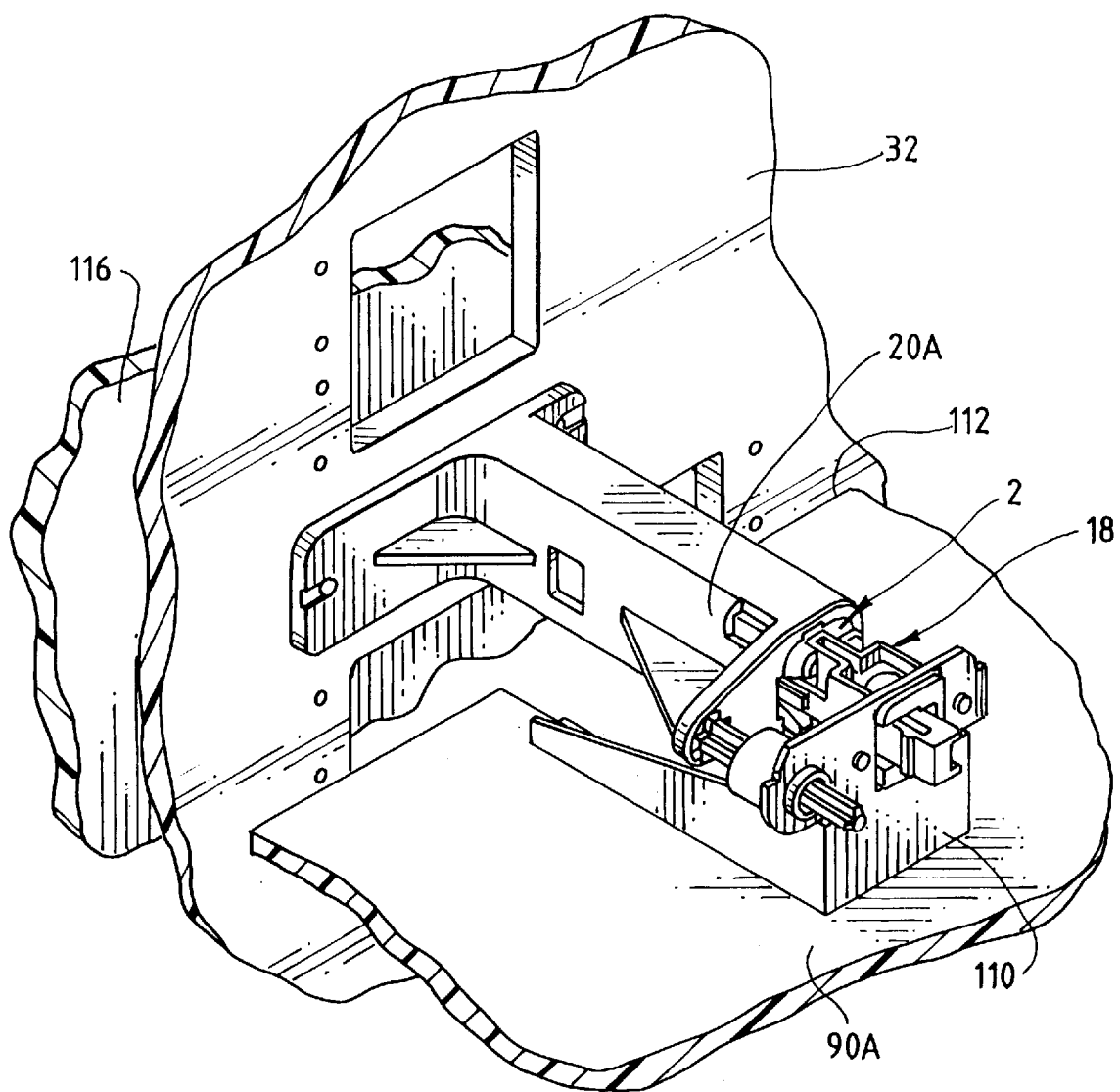
FIG. 13 is a perspective view of an alternate embodiment of a fiber optic connector assembly incorporating the concepts of the invention.

Referring to the drawings in greater detail, FIGS. 1–12 show a first embodiment of a fiber optic connector assembly incorporating the concepts of the invention, and FIGS. 13 and 14 show a second embodiment of a fiber optic connector assembly incorporating the concepts of the invention. In FIGS. 1–12, FIGS. 1–8 show details of a motherboard adapter assembly, generally designated 16, and FIGS. 9–12 show a daughterboard connector assembly, generally designated 18, which is mateable or capable of being coupled to motherboard adapter assembly 16.

Referring first to FIGS. 1–4, motherboard adapter assembly 16 basically includes a motherboard housing 20 having an inner housing insert 22, along with a motherboard adapter subassembly 24. The adapter subassembly is insertable into housing 20 and inner housing insert 22 in the direction of arrow "A". A dust cap 26 is insertable into adapter subassembly 24 in the direction of arrow "B", but the dust cap is a temporary component and does not form a part of the invention.

Motherboard housing 20 includes four mounting posts 28 at the corners thereof for insertion into four mounting holes 30 in a printed circuit board (motherboard) 32 about an aperture 34 in the motherboard. Inner housing insert 22 is shaped generally in the form of a rectangular ring. The insert is narrower than housing 20 and is captured within an inner circumferential recess 36 (FIG. 2) on the inside of the motherboard housing. As will be seen hereinafter, the inner housing insert is restricted against movement in an insertion direction generally parallel to arrow "A", but the insert is allowed to float or have movement in a lateral direction relative to the motherboard housing 20 generally transverse to the direction of arrow "A". Each of housing 20 and insert 22 is a one-piece structure unitarily molded of dielectric material such as plastic or the like.

Motherboard adapter subassembly 24 generally is a two-part structure including a first or front part 38 and a second or rear part 40. A single shutter member 42 and a set of dual shutter members 44 are mounted within the adapter subassembly. The two parts 38 and 40 of the adapter subassembly are interconnected by means of a pair of hooked flexible latch arms 46 projecting from rear adapter part 40 and insertable into the inside of front adapter part 38 for snapping into engagement with a pair of fixed latch shoulders 48 formed by apertures in the side walls of the front adapter part. Adapter subassembly 24 is mounted within motherboard housing 20 and inner housing insert 22 in the direction of arrow "A" and secured therein by means of a pair of flexible latch arms 50 having retention shoulders 50a near the distal ends thereof. The retention arms 50 move into grooves 51 in rear adapter part 40, and retention shoulders 50a of the latch arms engage with housing insert 22, as will be seen hereinafter. Suffice it to say, when adapter subassembly 24 is engaged with inner housing insert 22, the adapter subassembly is restricted against movement relative to motherboard housing 20 in the insertion direction "A" but is allowed to float in the lateral direction generally transverse to the insertion direction. In other words, the adapter subassembly "assumes" the movement or non-movement of inner housing insert 22.

Figure 3:
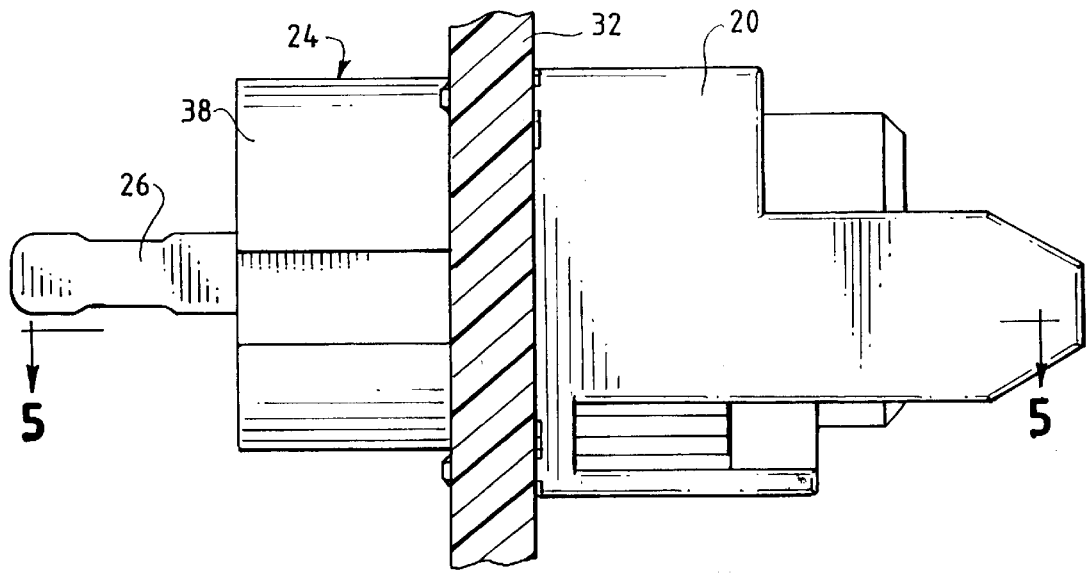
FIG. 3 is a top plan view of the motherboard adapter assembly.
Figure 4:
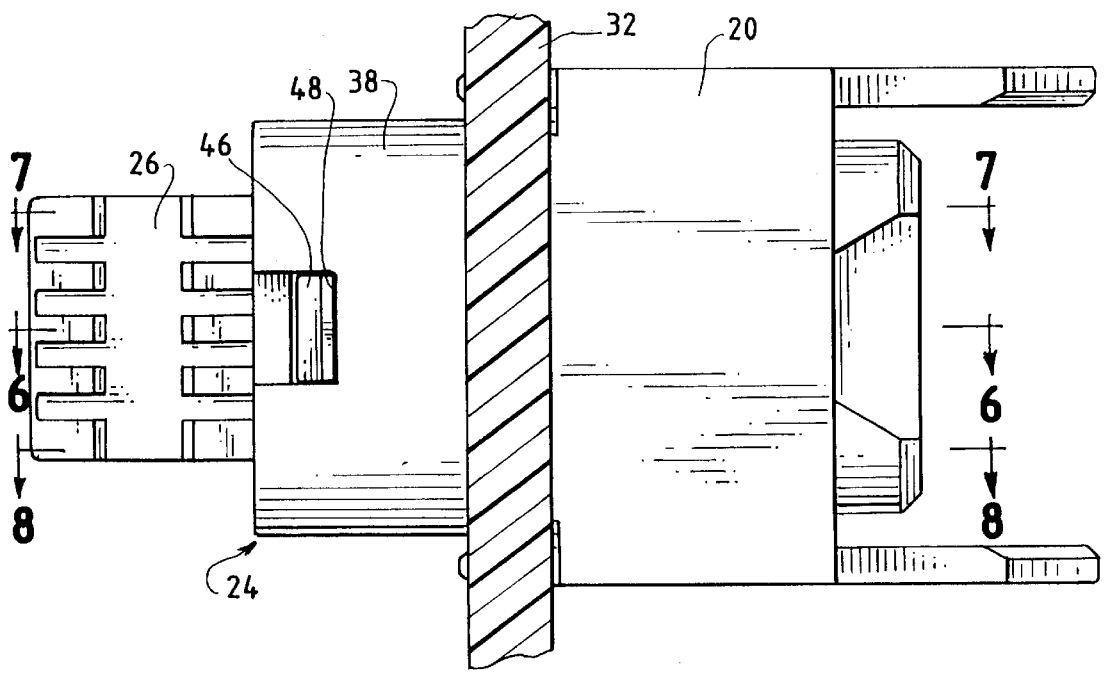
FIG. 4 is a side elevational view of the motherboard adapter assembly.
Figure 5:
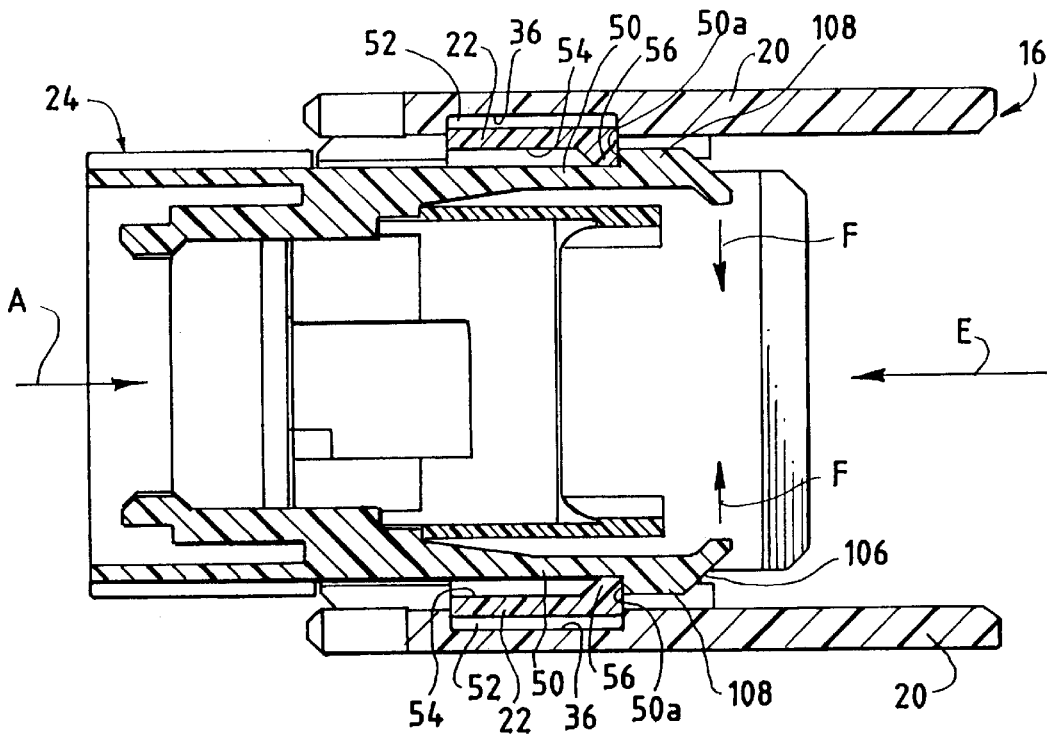
FIG. 5 is a vertical section taken generally along lien 5—5 of FIG. 3.

Referring to FIG. 5 in conjunction with FIG. 2, inner housing insert 22 clearly can be seen mounted within inner circumferential recess 36 of motherboard housing 20 with spacing indicated at 52 between the inner insert and the outer housing. It also can be seen that the width of the inner insert is substantially the same as the width of recess 36 to, thereby, restrict relative movement between the insert and the housing axially of the motherboard adapter assembly as indicated by insertion arrow "A". It should be noted in FIG. 5 that the inner housing insert, itself, has a pair of inside recesses 54, with a latch shoulder 56 projecting radially inwardly from the recess at the rear thereof.

FIG. 5 also shows that adapter subassembly 24 has been inserted into motherboard housing 20 in the direction of arrow "A" until retention shoulders 50a on the outsides of flexible latch arms 50 have locked into engagement with fixed latch shoulders 56 on the inside of inner housing insert 22. Therefore, as stated above, adapter subassembly 24 "assumes" the lateral movement of inner housing insert 22 relative to housing 20 and also assumes the restriction on movement relative to the housing in the insertion direction.

Figure 6:
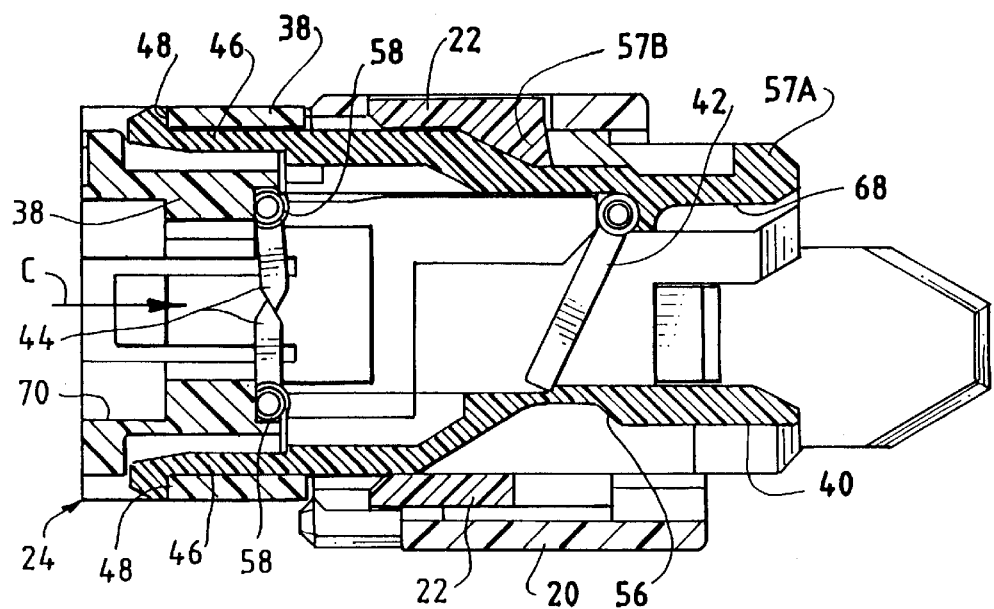
FIG. 6 is a horizontal section taken generally along line 6—6 of FIG. 4.

FIG. 6 shows hooked flexible latch arms 46 of rear adapter part 40 locked in engagement with latch shoulders 48 of front adapter part 38 of adapter subassembly 24. FIG. 6 further shows a fixed latch shoulder 56 on the bottom of rear adapter part 40 of the adapter subassembly. Rear housing part 40 has a stop 57A and inner housing insert 22 has a stop 57B, for purposes described hereinafter. Finally, FIG. 6 shows a pair of coil springs 58 which bias dual shutter members 44 to a closed position. When an associated fiber optic transmission means, such as a fiber optic connector, is inserted into the motherboard adapter assembly in the direction of arrow "C", shutter members 44 will be biased open, and coil springs 58 will automatically close the shutter members when the associated connector is removed.

Figure 7:
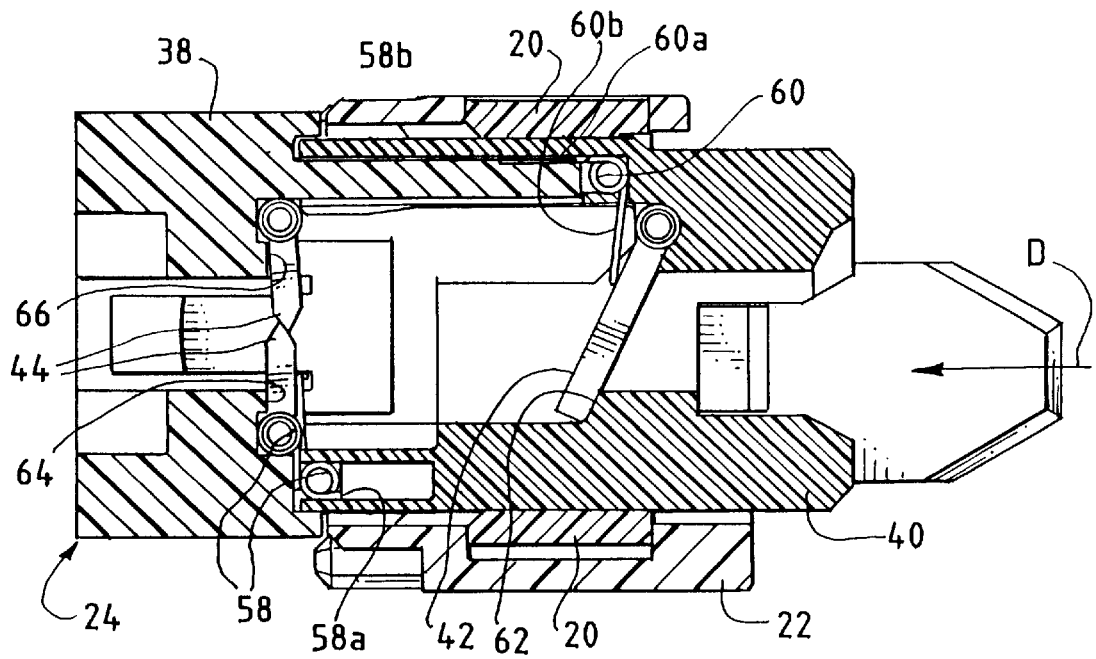
FIG. 7 is a horizontal section taken generally along line 7—7 of FIG. 4.
Figure 8:
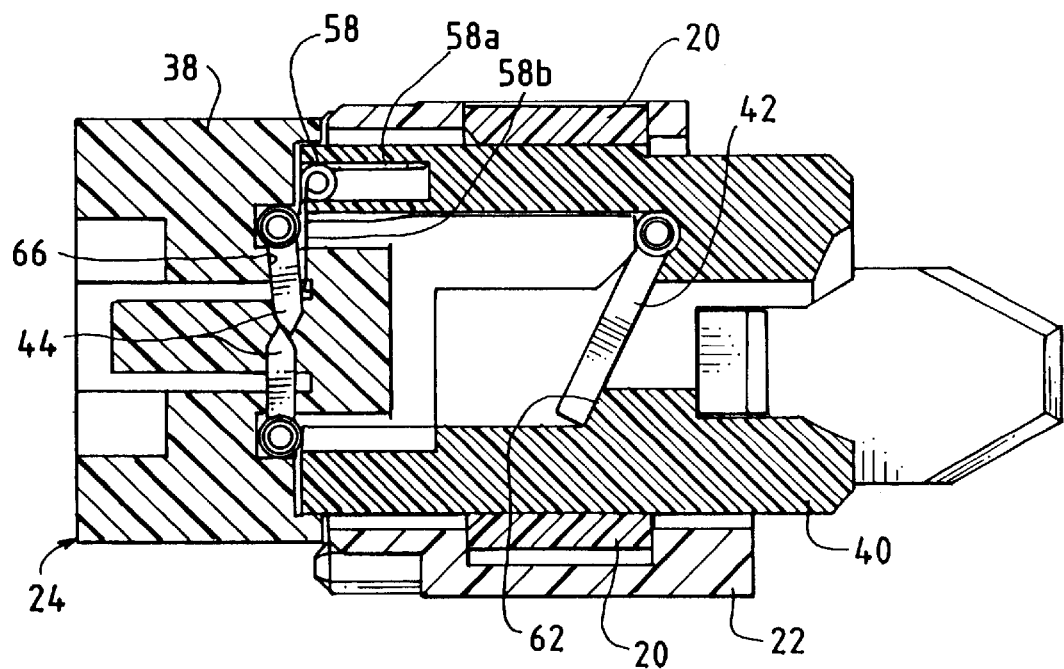
FIG. 8 is a horizontal section taken generally along line 8—8 of FIG. 4.

FIG. 7 shows a coil spring 60 having one end 60a locked within the adapter subassembly and an opposite end 60b engaging the back side of single shutter member 42. This spring biases the shutter member against a stop 62 in a closed position. When a fiber optic connector (described hereinafter) is inserted into adapter subassembly 24 in the direction of arrow "D", shutter member 42 is biased open against spring 60. When the connector is removed, the spring biases shutter member 42 back to its closed position shown in FIG. 7. This depiction also shows that one of the springs 58 includes a fixed end 58a locked to the adapter subassembly and an opposite end 58b for biasing one of the dual shutter members 44 against a stop 64. FIG. 8 shows the other spring 58 having a fixed end 58a and an opposite end 58b for biasing the other shutter member 44 against a stop 66 in the closed position. Basically, as best seen in FIG. 6, adapter subassembly 24 is an open-ended assembly defining a first receptacle end 68 for receiving daughterboard connector assembly 18 (FIGS. 9–12) and a second receptacle end 70 for receiving an associated fiber optic transmission means such as a second fiber optic connector.

Figure 9:
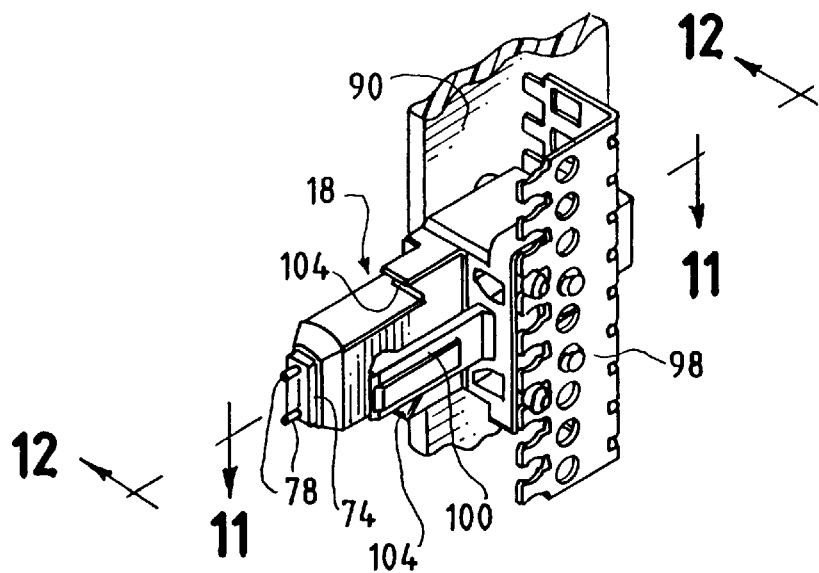
FIG. 9 is a perspective view of the daughterboard connector assembly mounted to a second printed circuit board (daughterboard)
Figure 10:
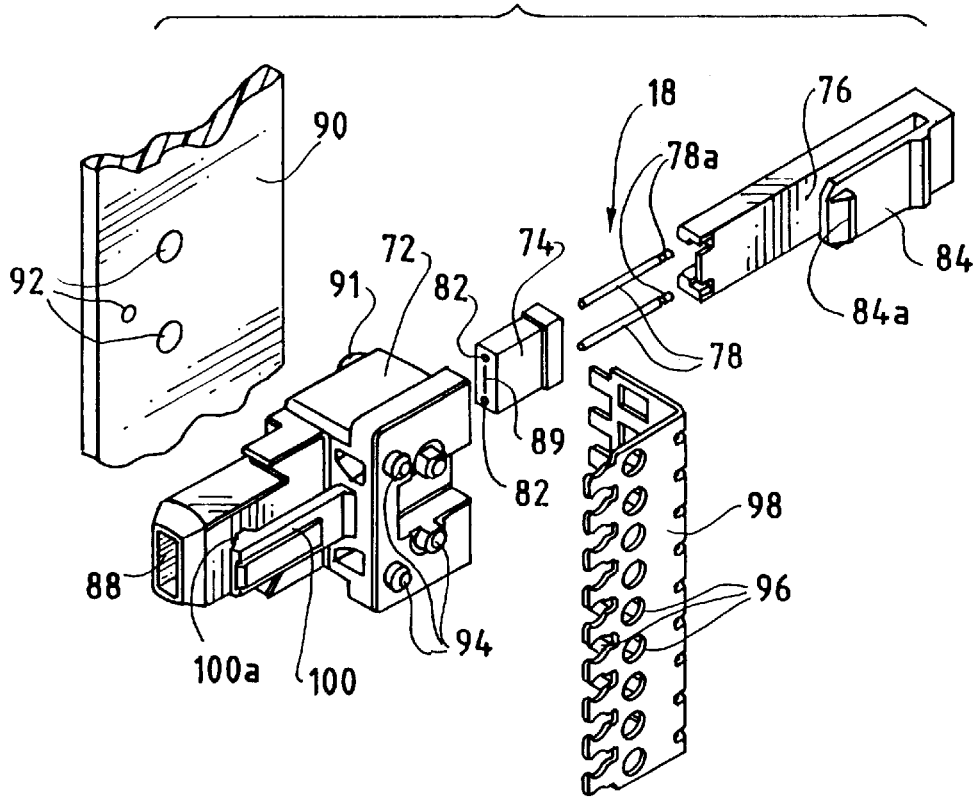
FIG. 10 is an exploded perspective view of the daughterboard connector assembly in conjunction with the daughterboard.

Referring to FIGS. 9–12, daughterboard connector assembly 18 includes a daughterboard housing 72 mounting a ferrule 74, a pin holder 76 and a pair of alignment pins 78. As seen in FIGS. 11 and 12, the alignment pins have head portions 78a captured within recesses or slots 80 at the front end of pin holder 76, and the alignment pins project through bores 82 in ferrule 74. The alignment pins project forwardly of a front mating face 74a of the ferrule for insertion into appropriate alignment holes in the ferrule of the second connector which is inserted into receptacle end 70 (FIG. 6) of adapter subassembly 24. As best seen in FIG. 11, pin holder 76 has a forwardly cantilevered flexible latch arm 84 with a hook 84a at a distal end thereof for engagement behind a latch shoulder 86 on daughterboard housing 72 to hold the pin holder within the housing and to position ferrule 74 through a forward opening 88 of the housing. As seen in FIG. 12, ferrule 74 has a plurality of parallel passages 89 for receiving the fibers of a flat multi-fiber optical cable.

The daughterboard housing 72 of daughterboard connector assembly 18 is mounted to a printed circuit board (daughterboard) 90 by means of mounting posts 91 on the daughterboard housing insertable into mounting holes 92 in the daughterboard. The housing has a plurality of mounting posts 94 on an opposite side thereof for insertion into mounting holes 96 in a stiffening bracket 98.

Referring to FIGS. 10 and 11 in conjunction with FIG. 2, daughterboard housing 72 of daughterboard connector assembly 18 has a cantilevered, flexible latch arm 100 projecting forwardly from and spaced laterally of the front nose portion of the daughterboard housing. The flexible latch arm has an inwardly directed latch hook 100a at the distal end of the arm for latching engagement with a fixed latch shoulder 102 (FIG. 2) on the outside of rear part 40 of adapter subassembly 24. Therefore, when daughterboard connector assembly 18 is inserted into receptacle end 68 (FIG. 6) of adapter subassembly 24, the daughterboard connector assembly becomes coupled to the adapter subassembly by means of latch arm 100/latch hook 100a and latch shoulder 102.

Although visible in FIGS. 9 and 10, FIG. 12 best shows that daughterboard housing 72 of daughterboard connector assembly 18 includes a pair of angled release shoulders 104 at the top and bottom thereof. FIG. 5 best shows that the extreme distal ends of latch arms 50 of the adapter subassembly have inwardly angled abutment surfaces 106, and these abutment surfaces are exposed for engagement by release shoulders 104 of daughterboard connector assembly 18 when the assembly is inserted into motherboard adapter assembly 16 in the direction of arrow "E" (FIG. 5). When the daughterboard connector assembly is coupled to the adapter subassembly (i.e. flexible latch arm 100 engages fixed latch shoulder 102), release shoulders 104 on the motherboard housing engage surfaces 106 on flexible latch arms 50 and bias the latch arms transversely inwardly in the direction of arrows "F" (FIG. 5). When the latch arms are biased inwardly, retention shoulders 50a on the outsides of the flexible latch arms are disengaged from fixed latch shoulders 56 of inner housing insert 22, whereupon outside head portions 108 of flexible latch arms 50 move into inside recesses 54 of inner housing insert 22. Adapter subassembly 24 (along with daughterboard connector assembly 18), thereby, are no longer restricted against axial movement relative to motherboard housing 20. In essence, release shoulders 104 on the daughterboard connector assembly comprise a release means which is effective to release the restrictions on the axial movement of adapter subassembly 24 relative to connector housing 20. Therefore, once daughterboard connector assembly 18 is coupled to adapter subassembly 24, both the connector assembly and the adapter assembly are allowed to float both axially and laterally relative to motherboard housing 20 and motherboard 32. In turn, daughterboard 88 can float relative to the motherboard. This eliminates interacting forces between the daughterboard and the motherboard which, otherwise, could cause cracking, deformation, misalignment and/or poor performance of the boards. Stops 57A and 57B (FIG. 6) on the adapter subassembly and on the housing insert, respectively, prevent the adapter assembly from pulling out of the motherboard housing while allowing said relative movement. In actual practice, stops 57A and 57B are secondary or backup latch means in the absence of the daughterboard connector assembly. When the connector assembly is engaged with the adapter, latch arm 100 will prevent removal of the adapter, as the daughterboard connector assembly and/or the daughterboard will abut the motherboard housing and/or the motherboard.

FIGS. 13 and 14 show an alternate embodiment of a fiber optic connector assembly mountable between a motherboard 32 and a daughterboard 90A. Daughterboard connector assembly 18 is mounted to a bracket 110 which, in turn, is mounted to the daughterboard and spaced considerably from an edge 112 of the board. Daughterboard connector assembly 18 can be coupled to an adapter subassembly 24 substantially identical to that described above. A second fiber optic connector assembly, generally designated 114, can be coupled to the adapter subassembly from the opposite end thereof.

The principal difference between the fiber optic connector assembly shown in FIGS. 13 and 14 and the assembly shown in FIGS. 1–12 is that a motherboard housing 20A is considerably elongated to define an extender tube projecting from the back side of motherboard 32. By using such an elongated or extended housing, adapter subassembly 24 and second fiber optic connector 114 can be disposed substantially entirely within the elongated housing, so that motherboard 32 can be mounted very close to a frame wall or panel 116 as shown in FIG. 13.

Otherwise, the embodiment of FIGS. 13 and 14 again includes an inner housing insert 22 mounted within an inner circumferential recess 36 within housing 20A and functions substantially identical to that described above. Daughterboard connector assembly 18 again has a flexible latch arm 100 for engaging a fixed latch shoulder 102 on the adapter subassembly. The daughterboard connector assembly again has release shoulders 104 for releasing flexible latch arms 50 on the adapter subassembly. In essence, the fiber optic connector assembly of FIGS. 13 and 14 functions substantially identical to the assembly described above in relation to FIGS. 1–12, except for the extended construction of motherboard housing 20A.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:
1. A fiber optic connector assembly, comprising:
   a housing;
   an adapter mountable on the housing;
   a fiber optic connector insertable into the adapter in an insertion direction;
   first complementary engagement means between the adapter and the housing to restrict relative movement therebetween in said insertion direction while allowing relative movement therebetween in a lateral direction generally transverse to said insertion direction;
   second complementary engagement means between the adapter and the fiber optic connector to couple the connector to the adapter for movement therewith; and
   release means on the fiber optic connector operatively associated with the first complementary engagement means to disengage the first complementary engagement means when said second complementary engagement means are engaged and, thereby, remove the restriction on said relative movement of the adapter in said insertion direction.

2. The fiber optic connector assembly of claim 1 wherein said housing is at least a two-part assembly including an outer housing part and an inner housing insert.

3. The fiber optic connector assembly of claim 2 wherein said first complementary engagement means are between the adapter and the inner housing insert.

4. The fiber optic connector assembly of claim 3 wherein said inner housing insert is mounted in the outer housing part with a loose engagement in said lateral direction while being restricted against relative movement in said insertion direction.

5. The fiber optic connector assembly of claim 2 wherein said outer housing part is adapted for mounting on a printed circuit board.

6. The fiber optic connector assembly of claim 1 wherein said first complementary engagement means comprise at least one flexible latch arm on the adapter engageable with a fixed latch shoulder on the housing.

7. The fiber optic connector assembly of claim 6 wherein said release means comprises a detent on the fiber optic connector engageable with said flexible latch arm to move the latch arm out of engagement with the latch shoulder.

8. The fiber optic connector assembly of claim 1 wherein said second complementary engagement means comprise at least one flexible latch arm on the fiber optic connector engageable with a fixed latch shoulder on the adapter.

9. The fiber optic connector assembly of claim 1 wherein said adapter includes a first receptacle end adapted for receiving the fiber optic connector and a second receptacle end adapted for receiving an associated fiber optic transmission means.

10. The fiber optic connector assembly of claim 9 wherein said adapter includes a two-part housing containing at least one shutter member therewithin.

11. The fiber optic connector assembly of claim 1 wherein said housing is adapted for mounting on a printed circuit board.

12. The fiber optic connector assembly of claim 11 wherein said fiber optic connector is adapted for mounting on a second printed circuit board.

13. A fiber optic connector assembly, comprising:
a two-part housing including an outer housing part adapted for mounting on a first printed circuit board and an inner housing insert mounted in the outer housing part with a loose engagement allowing relative movement therebetween in a lateral direction while restricting relative movement therebetween in an insertion direction;
an adapter mountable on the housing;
a fiber optic connector insertable into the adapter in said insertion direction, the connector being adapted for mounting on a second printed circuit board;
first complementary engagement means between the adapter and the inner housing insert whereby the adapter assumes the same movement and restriction of the insert;
second complementary engagement means between the adapter and the fiber optic connector to couple the connector to the adapter for movement therewith; and
release means on the fiber optic connector operatively associated with the first complementary engagement means to disengage the first complementary engagement means when said second complementary engagement means are engaged and, thereby, remove the restriction on said relative movement of the adapter in said insertion direction.

14. The fiber optic connector assembly of claim 13 wherein said first complementary engagement means comprise at least one flexible latch arm on the adapter engageable with a fixed latch shoulder on the housing.

15. The fiber optic connector assembly of claim 14 wherein said release means comprises a detent on the fiber optic connector engageable with said flexible latch arm to move the latch arm out of engagement with the latch shoulder.

16. The fiber optic connector assembly of claim 13 wherein said second complementary engagement means comprise at least one flexible latch arm on the fiber optic connector engageable with a fixed latch shoulder on the adapter.

17. A connector assembly, comprising:
a housing;
an adapter mountable on the housing;
a connector insertable into the adapter in an insertion direction;
first complementary engagement means between the adapter and the housing to restrict relative movement therebetween in said insertion direction while allowing relative movement therebetween in a lateral direction generally transverse to said insertion direction;
second complementary engagement means between the adapter and the connector to couple the connector to the adapter for movement therewith; and
release means on the connector operatively associated with the first complementary engagement means to disengage the first complementary engagement means when said second complementary engagement means are engaged and, thereby, remove the restriction on said relative movement of the adapter in said insertion direction.

18. The connector assembly of claim 17 wherein said housing is at least a two-part assembly including an outer housing part and an inner housing insert.

19. The connector assembly of claim 18 wherein said first complementary engagement means are between the adapter and the inner housing insert.

20. The connector assembly of claim 19 wherein said inner housing insert is mounted in the outer housing part with a loose engagement in said lateral direction while being restricted against relative movement in said insertion direction.

21. The connector assembly of claim 18 wherein said outer housing part is adapted for mounting on a printed circuit board.

22. The connector assembly of claim 17 wherein said first complementary engagement means comprise at least one flexible latch arm on the adapter engageable with a fixed latch shoulder on the housing.

23. The connector assembly of claim 22 wherein said release means comprises a detent on the connector engageable with said flexible latch arm to move the latch arm out of engagement with the latch shoulder.

24. The connector assembly of claim 17 wherein said second complementary engagement means comprise at least one flexible latch arm on the connector engageable with a fixed latch shoulder on the adapter.

25. The connector assembly of claim 17 wherein said adapter includes a first receptacle end adapted for receiving the connector and a second receptacle end adapted for receiving an associated transmission means.

26. The connector assembly of claim 25 wherein said adapter includes a two-part housing containing at least one shutter member therewithin.

27. The connector assembly of claim 17 wherein said housing is adapted for mounting on a printed circuit board.

28. The connector assembly of claim 27 wherein said connector is adapted for mounting on a second printed circuit board.

* * * * *